United States Patent
Allen

(10) Patent No.: US 11,193,577 B2
(45) Date of Patent: Dec. 7, 2021

(54) EPICYCLIC GEAR SYSTEM HAVING A PLURALITY OF FLUID DIRECTORS AND METHOD OF DIRECTING A FLUID IN AN EPICYCLIC GEAR SYSTEM

(71) Applicant: DEERE & COMPANY, Moline, IL (US)

(72) Inventor: Kevin M. Allen, Bartlesville, OK (US)

(73) Assignee: Deere & Company, Moline, IL (US)

( * ) Notice: Subject to any disclaimer, the term of this patent is extended or adjusted under 35 U.S.C. 154(b) by 56 days.

(21) Appl. No.: 16/657,187

(22) Filed: Oct. 18, 2019

(65) Prior Publication Data
US 2021/0116012 A1  Apr. 22, 2021

(51) Int. Cl.
*F16H 57/04* (2010.01)
*F16H 3/62* (2006.01)
*F16H 63/30* (2006.01)

(52) U.S. Cl.
CPC ............. *F16H 57/043* (2013.01); *F16H 3/62* (2013.01); *F16H 63/30* (2013.01)

(58) Field of Classification Search
CPC ..... F16H 57/0482–0486; F16H 57/042; F16H 57/043; F16H 57/0424; F16H 57/0426; F16H 57/08–2057/087
See application file for complete search history.

(56) References Cited

U.S. PATENT DOCUMENTS

2008/0268997 A1* 10/2008 Gooden .............. F16H 57/0431
                                                                475/160
2009/0247348 A1* 10/2009 Haupt .................. F16H 57/0479
                                                                475/159
2013/0102432 A1* 4/2013 Imai ..................... F16H 57/0409
                                                                475/159
2013/0225353 A1* 8/2013 Gallet ................. F16H 57/0423
                                                                475/159
2014/0106922 A1* 4/2014 Hancox ..................... F02C 7/36
                                                                475/159
2015/0300255 A1* 10/2015 Gallet ..................... F01D 25/18
                                                                475/159

(Continued)

FOREIGN PATENT DOCUMENTS

DE       69616639 T2    5/2002
JP       2008267420 A   11/2008

OTHER PUBLICATIONS

German Search Report issued in counterpart application No. 102020212747.6 dated Apr. 20, 2021 (10 pages).

*Primary Examiner* — Ernesto A Suarez
*Assistant Examiner* — Lillian T Nguyen

(57) ABSTRACT

An epicyclic gear system, a fluid directing ring, and a method of directing a fluid to at least one fluid passage of a carrier in an epicyclic gear system are provided. The system includes a sun gear, a plurality of planet gears disposed around the sun gear, a carrier configured for rotation relative to the sun gear and having at least one fluid passage having a fluid passage inlet for supplying a fluid to at least one of the plurality of planet gears, and a plurality of fluid directors fixed for rotation with the carrier and disposed radially inward from the fluid passage inlet. Each of the plurality of fluid directors has a directing surface configured to receive the fluid conveyed radially outwardly and direct the fluid in a direction of rotation of the carrier.

19 Claims, 5 Drawing Sheets

(56) References Cited

U.S. PATENT DOCUMENTS

| | | | |
|---|---|---|---|
| 2016/0091082 A1* | 3/2016 | Boland | F03D 9/25 475/159 |
| 2016/0201793 A1* | 7/2016 | Muldoon | F16H 1/28 475/159 |
| 2018/0258794 A1* | 9/2018 | Gedin | F16H 57/0479 |
| 2020/0300355 A1* | 9/2020 | Forsberg | F16H 57/043 |

* cited by examiner

EPICYCLIC GEAR SYSTEM HAVING A PLURALITY OF FLUID DIRECTORS AND METHOD OF DIRECTING A FLUID IN AN EPICYCLIC GEAR SYSTEM

BACKGROUND

Epicyclic gear systems include a sun gear that is centrally located on a central shaft. The sun gear is in meshed engagement with a plurality of planetary or planet gears, and the planet gears are in meshed engagement with an outer ring gear. The planet gears are rotatably mounted on a carrier that may rotate relative to the sun gear. A second shaft may be coupled to the carrier to receive torque from or supply torque to the epicyclic gear system. A speed and torque difference may be realized between the central shaft and the second shaft. An oil or lubricant may be circulated through one or more components or gears of the epicyclic gear system in order to reduce the operating temperature of the system and/or individual components of the system.

SUMMARY

Various aspects of examples of the present disclosure are set out in the claims.

In accordance with an embodiment of the present disclosure, an epicyclic gear system is provided. The system includes a sun gear, a plurality of planet gears disposed around the sun gear, a carrier configured for rotation relative to the sun gear and comprising at least one fluid passage having a fluid passage inlet for supplying a fluid to at least one of the plurality of planet gears, and a plurality of fluid directors fixed for rotation with the carrier and disposed radially inward from the fluid passage inlet. Each of the plurality of fluid directors have a directing surface configured to receive the fluid conveyed radially outwardly and direct the fluid in a direction of rotation of the carrier.

In accordance with an embodiment of the present disclosure, a fluid directing ring configured for operation between a shaft and at least one fluid passage of a carrier of an epicyclic gear system is provided. The fluid directing ring includes a plurality of fluid directors each having a directing surface configured to receive fluid conveyed radially outwardly from the shaft and direct the fluid in a direction of rotation of the carrier and a circumferentially extending connector connecting the plurality of fluid directors and at least partially defining a groove configured to receive the fluid for supply to the at least one fluid passage.

In accordance with an embodiment of the present disclosure, a method of directing a fluid to at least one fluid passage of a carrier in an epicyclic gear system is provided. The method includes conveying the fluid radially outwardly toward at least one directing surface of a plurality of fluid directors, directing the fluid in a direction of rotation of the carrier with the at least one directing surface of the plurality of fluid directors, receiving the fluid in a groove disposed radially outside of the plurality of fluid directors, and supplying the fluid from the groove to the at least one fluid passage of the carrier.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one embodiment of the subject matter of this disclosure is understood by referring to FIGS. 1 through 5 of the drawings.

Figure 1:
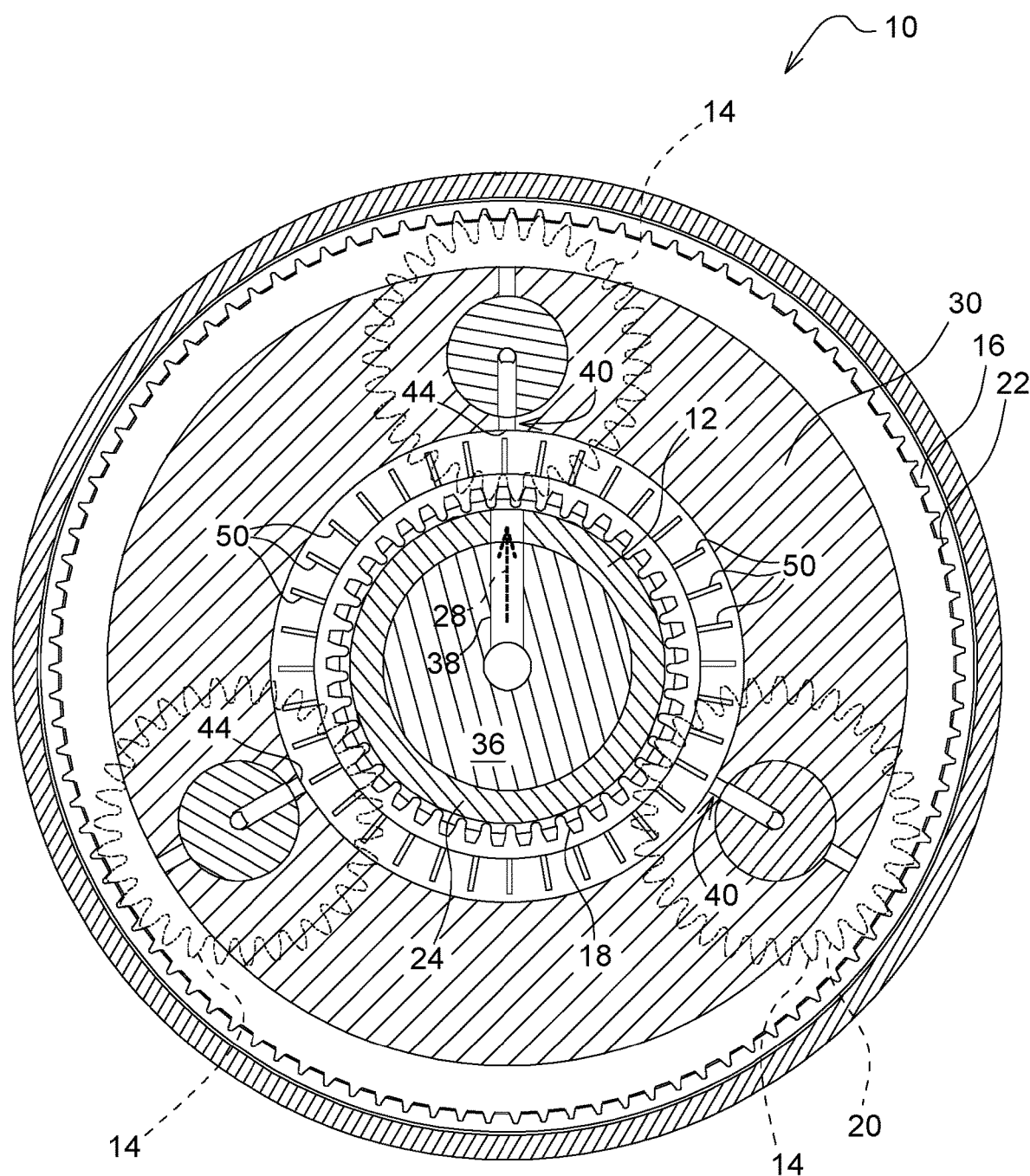
FIG. 1 is a cross-sectional view of an epicyclic gear system in accordance with an embodiment of the present disclosure.

Referring now to FIG. 1, an epicyclic gear system 10 is illustrated in accordance with an embodiment of the present disclosure. The system 10 includes a sun gear 12 and a plurality of planetary or planet gears 14 disposed around the sun gear 12. The sun gear 12 engages the planet gears 14 via sun gear teeth 18 and planet gear teeth 20. The sun gear 12 includes an outer periphery 24 having the sun gear teeth 18. The system 10 of the illustrated embodiment includes a ring gear 16 that is disposed around the planet gears 14 and the sun gear 12 and engages the planet gears 14 via ring gear teeth 22. The system 10 further includes a carrier 30 connecting the planet gears 14. The carrier 30 rotates or is configured to rotate relative to the sun gear 12, and the planet gears 14 are rotatably coupled to the carrier 30 such that the planet gears 14 rotate relative to the carrier 30. The sun gear 12 is mounted on a shaft 36 in the illustrated embodiment.

Figure 2:
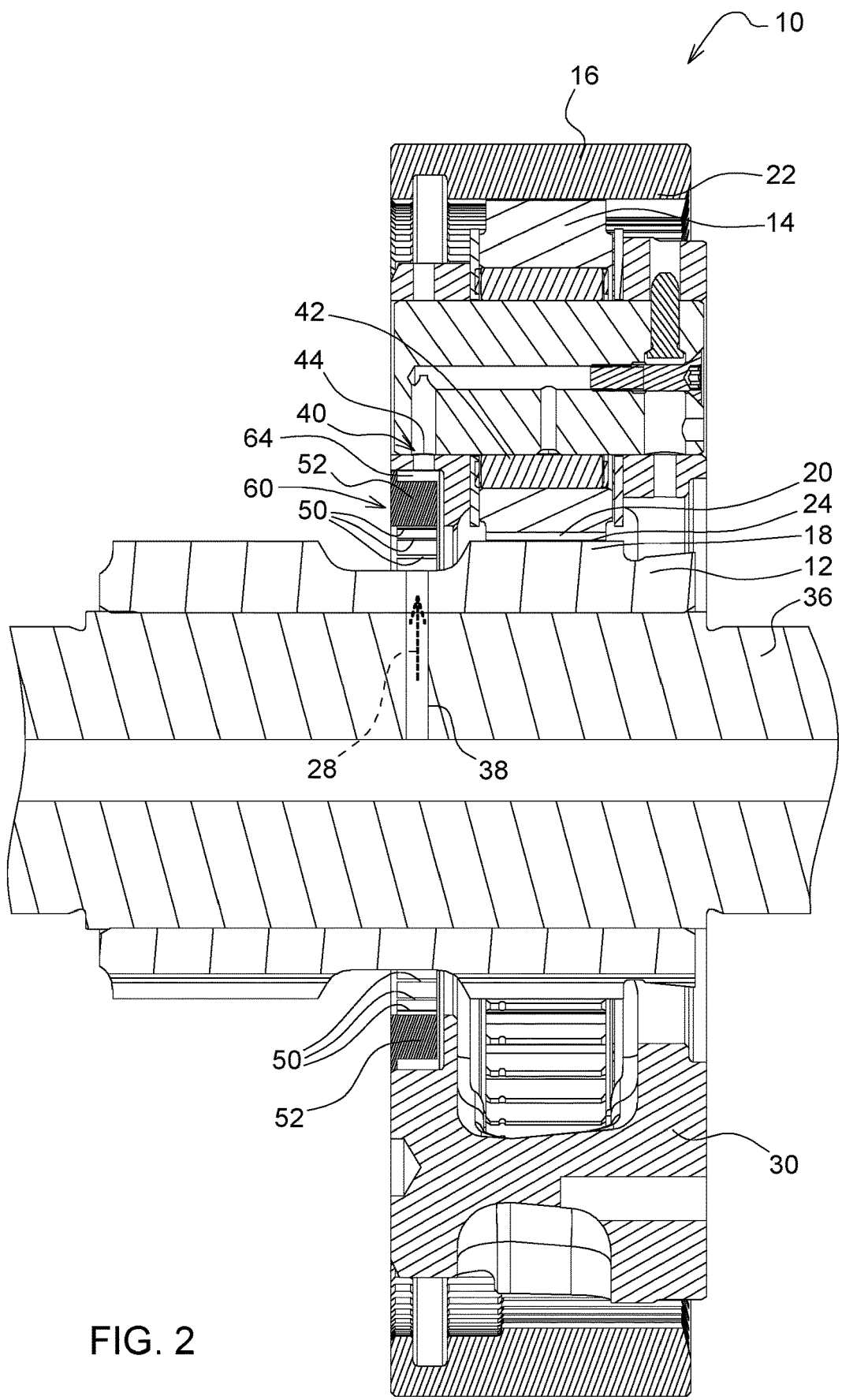
FIG. 2 is a cross-sectional view of an epicyclic gear system in accordance with an embodiment of the present disclosure.

With reference to FIG. 2 and continuing reference to FIG. 1, the carrier 30 includes one or more fluid passage(s) 40. The fluid passages 40 of the illustrated embodiment include one or more fluid passages 40 for each of the planet gears 14. In particular, each fluid passage 40 is configured to supply a fluid 28 to a bearing 42 of one or more of the planet gears 14. In the illustrated embodiment, three fluid passages 40 supply the fluid 28 to the bearing 42 of each of the three planet gears 14. Each fluid passage 40 includes a fluid passage inlet 44 for supplying the fluid 28 to one or more of the planet gear(s) 14. The fluid 28 in the illustrated embodiment is an oil or other lubricant, but the fluid 28 of additional embodiments may include any fluid capable of being utilized with the system 10.

Fluid directors 50 are fixed for rotation with the carrier 30 and disposed radially inward from the fluid passage inlet 44. Each of the fluid directors 50 includes at least one directing surface 52 receiving or configured to receive the fluid 28 conveyed radially outwardly. The directing surface 52 also directs or is configured to direct the fluid 28 in a direction of rotation of the carrier 30. In the illustrated embodiments, the direction of rotation refers to a rotational direction relative to the sun gear 12 and/or the shaft 36. However, in additional embodiments, the direction of rotation refers to an absolute direction of rotation.

The fluid 28 travels axially through a shaft fluid passage 38 conveying or supplying or configured to convey or supply the fluid 28 radially outwardly toward the fluid directors 50 by pressure applied to the fluid 28 upstream of the shaft fluid passage 38. In one non-limiting example, the fluid 28 is pumped to the shaft fluid passage 38 by a fluid pump not shown in the illustrated embodiments. In additional embodiments, the fluid 28 is conveyed radially outwardly by centrifugal or other means. The shaft fluid passage 38 includes multiple fluid passages in an embodiment and includes a single fluid passage in another embodiment. In further embodiments, the shaft fluid passage 38 may include any number of parts or segments, formed with any direction or angle, to convey or supply the fluid 28 radially outwardly through the sun gear 12 and/or the shaft 36. Although the shaft fluid passage 38 is shown as not extending through the sun gear teeth 18, in additional embodiments not illustrated, the shaft fluid passage 38 extends through the sun gear teeth 18 and/or through the shaft 12 and not through the sun gear 12.

The shaft fluid passage 38 is axially aligned with the directing surface 52 of the fluid directors 50. In the illustrated embodiment, the shaft fluid passage 38 is axially aligned with the directing surface 52 of all of the fluid directors 50. The directing surface 52 of one or more of the fluid directors 50 is axially aligned with the fluid passage inlet 44 of the fluid passage(s) 40 in at least one embodiment. Further shown in FIG. 2, the shaft fluid passage 38 extends through the shaft 36 and the sun gear 12. Although the shaft 36 and the sun gear 12 are shown as two separate parts in FIG. 2, in additional embodiments not shown, the shaft 36 and the sun gear 12 are formed integrally as a single member with the shaft fluid passage 38 extending therethrough.

Figure 3:
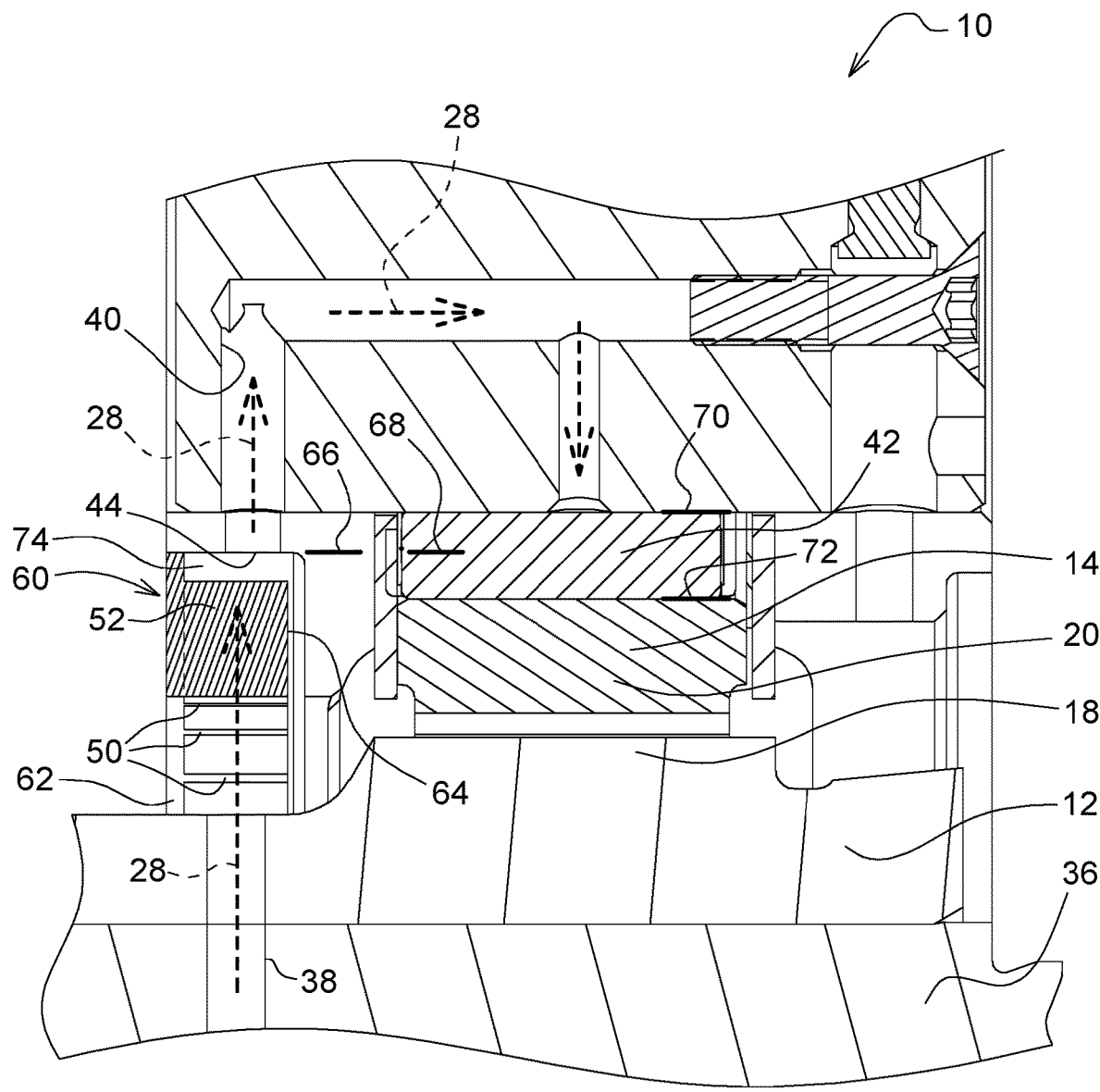
FIG. 3 is an enlarged cross-sectional view of an epicyclic gear system in accordance with an embodiment of the present disclosure.
Figure 4:
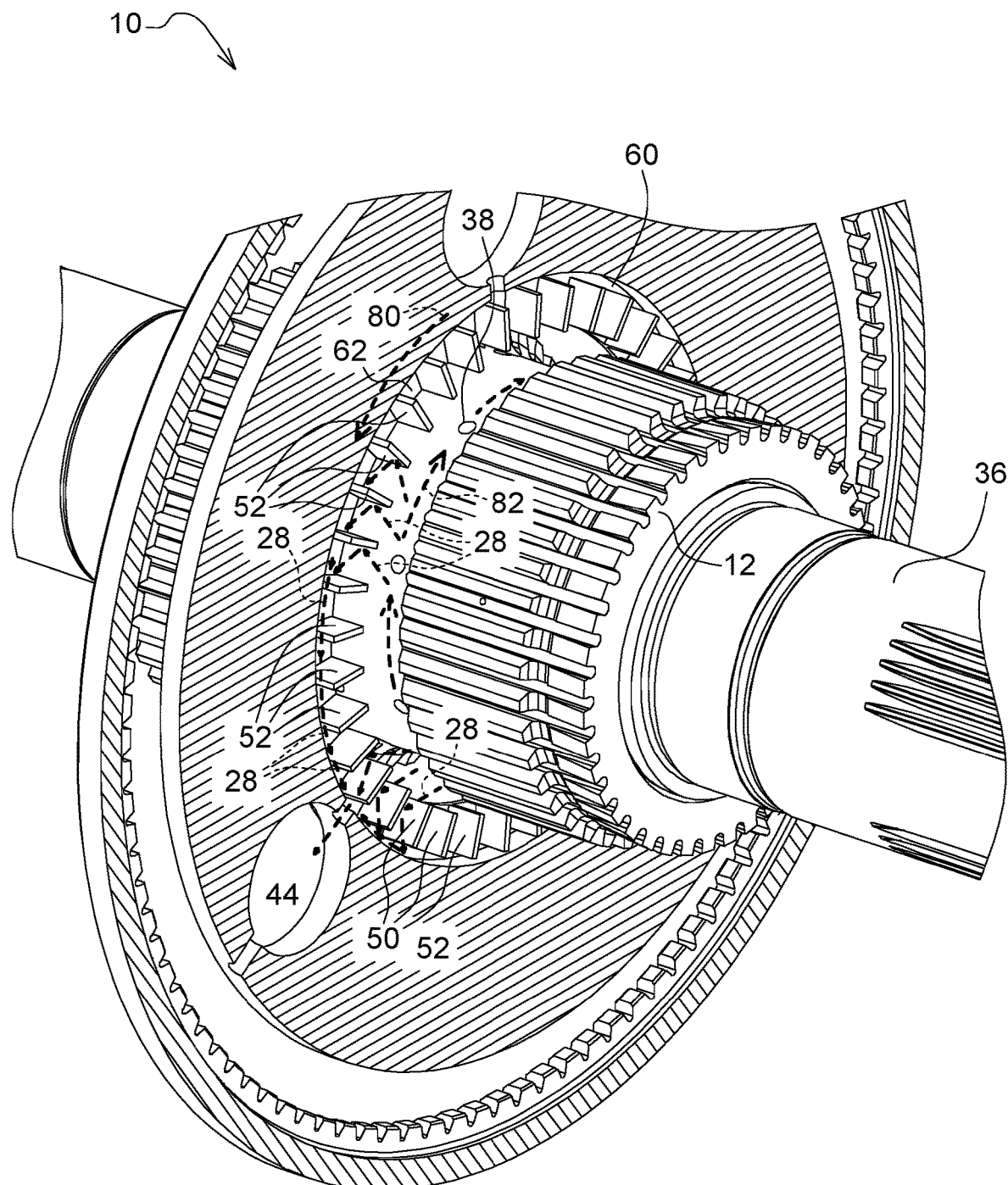
FIG. 4 is a partial cross-sectional view of an epicyclic gear system in accordance with an embodiment of the present disclosure.

Referring now to FIGS. 3 and 4 with continuing reference to FIGS. 1 and 2, the directing surface 52 is shown receiving the fluid 28 conveyed radially outwardly and directing the fluid 28 in a direction of rotation 80 of the carrier 30. The fluid 28 is conveyed radially outwardly and in a direction of rotation 82 of the shaft 36 and the shaft fluid passage 38. It will be appreciated that the rotation of the carrier 30 and the rotation of the shaft 36 and the shaft fluid passage 38 may vary in rotational velocity and/or direction absolutely and/or relative to each other. As shown in the FIGs., the directing surface 52 of each of the fluid directors 50 extends in a radial direction. The directing surface 52 in the illustrated embodiment extends directly radially relative to the shaft 36, but may extend partially radially or circumferentially and radially, or extend radially within an angle of 90 degrees or less relative to a radial line from the shaft 36, in additional embodiments. In a non-limiting example, the directing surface 52 of each of the fluid directors 50 extends along a plane at a predetermined angle from a radially extending plane. The predetermined angle may be determined by relative direction of rotation, relative speed difference between the carrier 30 and the shaft fluid passage 38, size of the fluid director 50 and/or directing surface 52, and/or the volumetric flow rate and/or the velocity of the fluid 28 directed by the directing surface 52.

The system 10 of the illustrated embodiment further includes a fluid directing ring 60. Although the fluid directing ring 60 and the fluid directors 50 are shown as being formed separately from the carrier 30, the fluid directing ring 60 and the fluid directors 50 may be integrally formed with the carrier 30 and/or any other part coupled thereto in embodiments not shown. The fluid directing ring 60 of the illustrated embodiment operates between the shaft 12 and/or the sun gear 12 and the fluid passage(s) 40 of the carrier 30. The fluid directing ring 60 includes the fluid directors 50 and a circumferentially extending connector 62 connecting the fluid directors 50. The fluid directors 50 are shown as being integrally formed with the connector 62 in the illustrated embodiment. In additional embodiments not shown, the fluid directors 50 are formed separately from the connector 62 and/or one or more of the portions of the fluid directing ring 60 are formed integrally with the carrier 30 or any other part coupled to the carrier 30. As best shown in FIG. 3, the connector 62 also at least partially defines a groove 64 that receives or is configured to receive the fluid 28 for supply to the one or more fluid passage(s) 40. As shown in FIG. 3, the fluid directors 50 are radially spaced from the fluid passage inlet 44 in the groove 64. In other words, a gap or spacing exists between the fluid directors 50 and the axially-extending surface of the groove 64 and/or the fluid passage inlet 44 in the groove 64. The radial spacing 74 allows the fluid 28 to flow in the groove 64 from the directing surface(s) 52 to the fluid passage inlet 44. The groove 64 receives or is configured to receive the fluid 28 for supply to the fluid passage(s) 40.

The groove 64 includes a groove outer diameter 66 maintaining or configured to maintain a bearing fluid supply level 68 of the bearing 42 of each of the planet gears 14. In the illustrated embodiment, the bearing fluid supply level 68 is at a radial position in a range between a bearing outer diameter 70 and a bearing inner diameter 72. However, in additional embodiments, the bearing fluid supply level 68 is positioned outside of this range.

Figure 5:
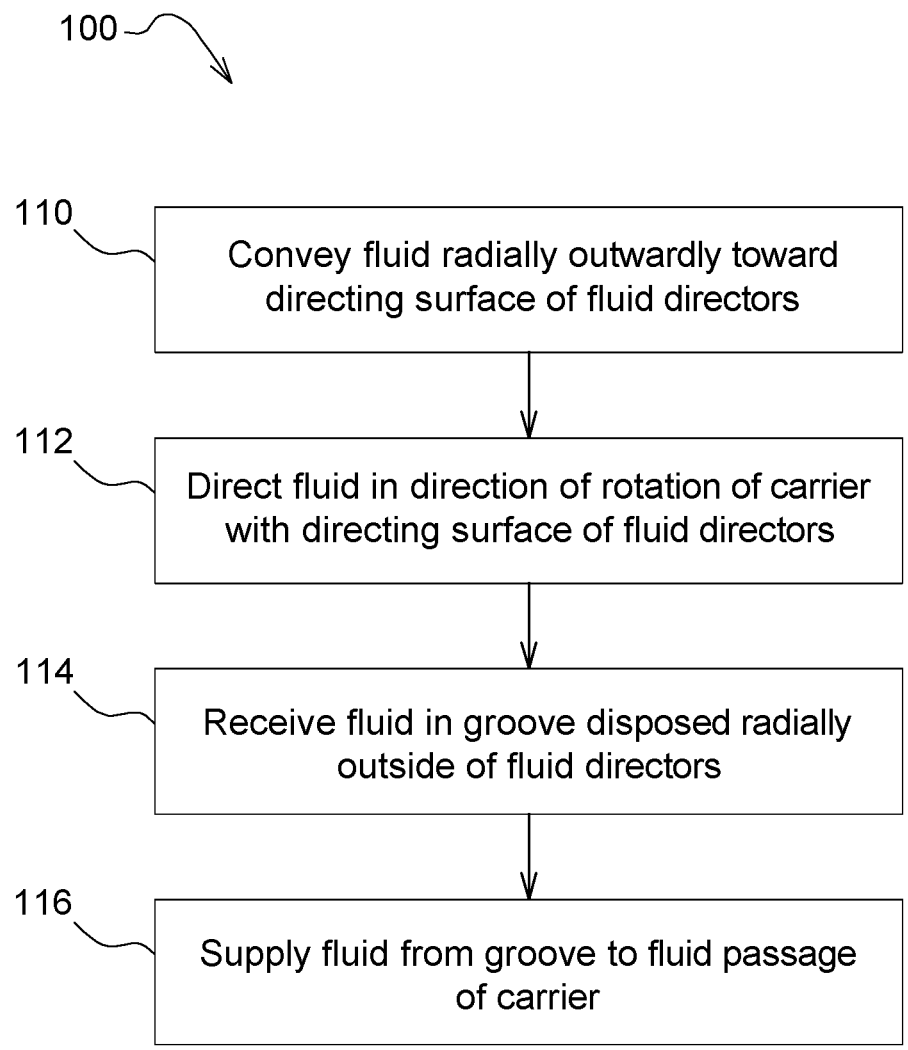
FIG. 5 illustrates a method of directing a fluid in an epicyclic gear system in accordance with an embodiment of the present disclosure.

Reference is now made to FIG. 5, which illustrates a method 100 of directing the fluid 28 to one or more fluid passage(s) 40 of the carrier 30 in the epicyclic gear system 10. The method 100 of one or more embodiments includes any structures, features, and/or functions of the embodiments of the system 10 described in the present disclosure. The method 100 of FIG. 5 includes conveying, at step 110, the fluid 28 radially outwardly toward the directing surface(s) 52 of the fluid director(s) 50. The method 100 further includes directing, at step 112, the fluid 28, in a direction of rotation of the carrier 30 with the directing surface(s) 52 of the fluid director(s) 50. The method 100 further includes receiving, at step 114, the fluid 28 in the groove 64 disposed radially outside of the fluid director(s) 50. The method 100 further includes supplying, at step 116, the fluid 28 from the groove 64 to the fluid passage(s) 40 of the carrier 30.

In additional embodiments, the method 100 includes receiving the fluid 28 in the groove 64 defined, at least in part, by the circumferentially extending connector 62 connecting the fluid director(s) 50. Further, the method 100 of at least one embodiment includes supplying the fluid 28 from the fluid passage(s) 40 of the carrier 30 to the bearing(s) 42 of the planet gear(s) 14 of the epicyclic gear system 10. The method 100 may further include conveying the fluid 28 radially outwardly from the shaft 36 and/or the sun gear 12 of the epicyclic gear system 10.

Without in any way limiting the scope, interpretation, or application of the claims appearing below, it will be appreciated that the embodiments of the present disclosure provide the system 10 and the method 100 to supply the fluid 28, such as an oil, to the bearing(s) 42 of the planet gear(s) 14 to increase oil circulation at and/or around the bearing(s) 42 for improved lubrication and cooling of the bearing(s) 42, the planet gear(s) 14, and the system 10. Specifically, a rotation of the carrier 30 relative to the shaft fluid passage 38 may not promote and/or may impede or delay flow of the fluid 28 to or through the fluid passage inlet 44 of the fluid passage(s) 40 and/or the bearing(s) 42. The system 10 and the method 100 described herein utilizes the fluid director(s) 50 to direct the fluid 28 so as to improve flow of the fluid 28 toward and/or through the fluid passage inlet 44 for circulation to the bearing(s) 42 and increase efficiency of the overall system.

As used herein, "e.g." is utilized to non-exhaustively list examples and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. An epicyclic gear system comprising:
    a sun gear;
    a plurality of planet gears disposed around the sun gear;
    a carrier configured for rotation relative to the sun gear and comprising at least one fluid passage having a fluid passage inlet for supplying a fluid to at least one of the plurality of planet gears; and
    a plurality of fluid directors fixed for rotation with the carrier and disposed radially inward from the fluid passage inlet, each of the plurality of fluid directors having a directing surface configured to receive the fluid conveyed radially outwardly and direct the fluid in a direction of rotation of the carrier, wherein the directing surface comprises a planar surface and wherein the directing surface of each of the plurality of fluid directors further comprises a rectangular shape with four edges where one of the four edges is coupled with the carrier.

2. The system of claim 1, wherein the directing surface of each of the plurality of fluid directors extends in a radial direction.

3. The system of claim 1, further comprising a fluid directing ring comprising the plurality of fluid directors.

4. The system of claim 3, wherein the fluid directing ring further comprises a circumferentially extending connector connecting the plurality of fluid directors and at least partially defining a groove configured to receive the fluid for supply to the at least one fluid passage.

5. The system of claim 4, wherein the plurality of fluid directors is radially spaced from the fluid passage inlet in the groove.

6. The system of claim 1, further comprising a shaft having a shaft fluid passage configured to convey the fluid radially outwardly toward the plurality of fluid directors.

7. The system of claim 6, wherein the shaft fluid passage is axially aligned with the directing surface of each of the plurality of fluid directors.

8. The system of claim 1, wherein the at least one fluid passage comprises at least one fluid passage for each of the plurality of planet gears.

9. The system of claim 1, further comprising a groove configured to receive the fluid for supply to the at least one fluid passage and having a groove outer diameter configured to maintain a bearing fluid supply level of a bearing of each of the plurality of planet gears.

10. The system of claim 1, wherein the directing surface of each of the plurality of fluid directors is axially aligned with the fluid passage inlet of the at least one fluid passage.

11. A fluid directing ring configured for operation between a shaft and at least one fluid passage of a carrier of an epicyclic gear system, the fluid directing ring comprising:
    a plurality of fluid directors each having a directing surface configured to receive fluid conveyed radially outwardly from the shaft and direct the fluid in a direction of rotation of the carrier, wherein the directing surface comprises a planar surface and wherein the directing surface of each of the plurality of fluid directors further comprises a rectangular shape with four edges where one of the four edges is coupled with the carrier; and
    a circumferentially extending connector connecting the plurality of fluid directors and at least partially defining a groove configured to receive the fluid for supply to the at least one fluid passage.

12. The fluid directing ring of claim 11, wherein the directing surface of each of the plurality of fluid directors extends in a radial direction.

13. The fluid directing ring of claim 11, wherein the plurality of fluid directors is radially spaced from the at least one fluid passage in the groove.

14. The fluid directing ring of claim 11, wherein the directing surface of each of the plurality of fluid directors is configured to be axially aligned with a fluid passage inlet of the at least one fluid passage.

15. A method of directing a fluid to at least one fluid passage of a carrier in an epicyclic gear system, the method comprising:
    conveying the fluid radially outwardly toward at least one directing surface of a plurality of fluid directors;
    directing the fluid in a direction of rotation of the carrier with the at least one directing surface of the plurality of fluid directors, wherein the at least one directing surface comprises a planar surface and wherein the directing surface of each of the plurality of fluid directors further comprises a rectangular shape with four edges where one of the four edges is coupled with the carrier;
    receiving the fluid in a groove disposed radially outside of the plurality of fluid directors;
    and supplying the fluid from the groove to the at least one fluid passage of the carrier.

16. The method of claim 15, wherein the groove is at least partially defined by a circumferentially extending connector connecting the plurality of fluid directors.

17. The method of claim 15, further comprising supplying the fluid from the at least one fluid passage of the carrier to at least one bearing of a planet gear of the epicyclic gear system.

18. The method of claim 15, wherein conveying the fluid radially outwardly comprises conveying the fluid radially outwardly from a shaft of the epicyclic gear system.

19. The method of claim 15, wherein conveying the fluid radially outwardly comprises conveying the fluid radially outwardly from a sun gear of the epicyclic gear system.

* * * * *